United States Patent
Higashi et al.

(10) Patent No.: US 10,788,137 B2
(45) Date of Patent: Sep. 29, 2020

(54) PRESSURE REGULATING VALVE

(71) Applicant: AISAN KOGYO KABUSHIKI KAISHA, Obu-shi, Aichi-ken (JP)

(72) Inventors: Shinya Higashi, Kasugai (JP); Koji Yoshida, Commerce Township, MI (US); Toshiaki Akamatsu, Kariya (JP); Yuji Yamashita, Hekinan (JP); Satoshi Nakamura, Ichinomiya (JP); Kensuke Niwa, Nagoya (JP)

(73) Assignee: AISAN KOGYO KABUSHIKI KAISHA, Obu-Shi, Aichi-Ken (JP)

( * ) Notice: Subject to any disclaimer, the term of this patent is extended or adjusted under 35 U.S.C. 154(b) by 0 days.

(21) Appl. No.: 16/333,662

(22) PCT Filed: Aug. 14, 2017

(86) PCT No.: PCT/JP2017/029250
§ 371 (c)(1),
(2) Date: Mar. 15, 2019

(87) PCT Pub. No.: WO2018/055949
PCT Pub. Date: Mar. 29, 2018

(65) Prior Publication Data
US 2019/0257437 A1 Aug. 22, 2019

(30) Foreign Application Priority Data

Sep. 20, 2016 (JP) .................. 2016-182684

(51) Int. Cl.
*F16K 17/04* (2006.01)
*F02M 37/46* (2019.01)
(Continued)

(52) U.S. Cl.
CPC ...... *F16K 17/0406* (2013.01); *B01D 35/1573* (2013.01); *F02M 37/00* (2013.01);
(Continued)

(58) Field of Classification Search
CPC ............ B01D 35/1573; B01D 2201/16; F02M 37/00; F02M 37/0023; F02M 37/0406;
(Continued)

(56) References Cited

U.S. PATENT DOCUMENTS 2,686,533 A * 8/1954 Gratzmuller .......... F16K 17/085
137/510
3,399,860 A * 9/1968 Billeter ..................... E03D 3/06
251/37
(Continued)

FOREIGN PATENT DOCUMENTS

JP  S5742167 U   3/1982
JP  H02131075 U  10/1990
(Continued)

OTHER PUBLICATIONS

Japanese Office Action dated Oct. 4, 2019 for Japanese Application No. 2016-182684 (4 p.).
(Continued)

*Primary Examiner* — William M McCalister
(74) *Attorney, Agent, or Firm* — Conley Rose, P.C.

(57) ABSTRACT

A pressure regulating valve includes a casing, a holder, a fixed valve, a movable valve, a spring member, a diaphragm, and a filter. The filter is configured to filter fluid flowing from a flow inlet of the casing into a pressure chamber. The filter includes a filtering part for filtering fluid and a holding part including a frame part for holding an outer periphery of the filtering part. An alignment structure configured to align the holding part at a predetermined position is provided between the holding part of the filter and the holder, or between the holding part of the filter and the casing.

16 Claims, 7 Drawing Sheets

(51) Int. Cl.
  *B01D 35/157* (2006.01)
  *F02M 37/00* (2006.01)
(52) U.S. Cl.
  CPC ........ *F02M 37/0023* (2013.01); *F02M 37/46* (2019.01); *B01D 2201/16* (2013.01)
(58) Field of Classification Search
  CPC ................ F02M 37/46; F16K 17/0406; Y10T 137/7781
  USPC ........................................................ 137/494
  See application file for complete search history.

(56) References Cited

U.S. PATENT DOCUMENTS

| | | | | |
|---|---|---|---|---|
| 5,533,478 | A * | 7/1996 | Robinson | B01D 35/02 123/510 |
| 5,778,926 | A * | 7/1998 | Tanaka | F16L 11/08 137/508 |
| 5,782,223 | A | 7/1998 | Yamashita et al. | |
| 5,785,032 | A | 7/1998 | Yamashita et al. | |
| 5,900,148 | A | 5/1999 | Izutani et al. | |
| 6,182,689 | B1 * | 2/2001 | Lauer | E03D 3/06 137/550 |
| 6,213,143 | B1 * | 4/2001 | Schwegler | B01D 35/157 137/115.27 |
| 6,334,460 | B1 * | 1/2002 | Hem | G05D 16/0655 123/459 |
| 6,371,088 | B1 * | 4/2002 | Wheeler | B01D 29/114 123/514 |
| 6,523,566 | B2 * | 2/2003 | Wynn, Jr. | F02M 37/22 137/550 |
| 7,131,457 | B2 * | 11/2006 | McIntyre | F02M 37/106 137/508 |
| 7,146,997 | B2 * | 12/2006 | Francis | F02M 69/54 137/14 |
| 7,617,991 | B2 * | 11/2009 | Wells | F02M 61/165 239/5 |
| 7,896,026 | B2 * | 3/2011 | Choi | B62D 5/062 137/550 |
| 8,360,740 | B2 * | 1/2013 | Leppert | F02M 37/10 123/509 |
| 2002/0026927 | A1 * | 3/2002 | Yoshioka | B01D 35/027 123/510 |
| 2004/0118756 | A1 * | 6/2004 | Robinson | B01D 29/114 210/90 |
| 2006/0207929 | A1 * | 9/2006 | Epping | F02M 37/46 210/483 |
| 2009/0025690 | A1 * | 1/2009 | Yamada | F02M 37/106 123/509 |
| 2010/0224806 | A1 * | 9/2010 | Yamamoto | F16K 31/128 251/58 |
| 2013/0312711 | A1 * | 11/2013 | Mason | F02M 37/0023 123/509 |

FOREIGN PATENT DOCUMENTS

| | | |
|---|---|---|
| JP | 2000220550 A | 8/2000 |
| JP | 2003278618 A | 10/2003 |
| JP | 2004019540 A | 1/2004 |
| WO | 96/23969 A1 | 8/1996 |

OTHER PUBLICATIONS

English Translation of Japanese Office Action dated Oct. 4, 2019 for Japanese Application No. 2016-182684 (4 p.).
PCT/JP20107/029250 International Search Report and Written Opinion dated Oct. 10, 2017 (10 p.).

* cited by examiner

PRESSURE REGULATING VALVE

CROSS-REFERENCE TO RELATED APPLICATIONS

The present application is a U.S. National Phase entry of, and claims priority to, PCT Application No. PCT/JP2017/029250, filed Aug. 14, 2017, which claims priority to Japanese Patent Application No. 2016-182684, filed Sep. 20, 2016, both of which are incorporated herein by reference in their entireties for all purposes.

STATEMENT REGARDING FEDERALLY SPONSORED RESEARCH OR DEVELOPMENT

Not applicable.

BACKGROUND

The present disclosure relates to a pressure regulating valves for regulating fluid pressures.

A pressure regulating valve is employed, for example, for a fuel supply device for feeding fuel from a fuel tank to an internal combustion engine (engine). A conventional pressure regulating valve of this type includes, for example, a structure illustrated in FIG. 10 (see for example, WO96/23969). A pressure regulating valve 100 includes a casing 110 constituting an outer shell and a holder 111 fixed to a bottom center of the casing 110. A fixed valve 112 is disposed at the upper end of the holder 111. A movable valve 113 can be seated on or removed from the fixed valve 112. An interior of the casing 110 is partitioned in upper and lower chambers by a diaphragm 114 as a movable partition wall. The casing 110 is divided into an upper portion and a lower portion to include an upper case 110a and a lower case 110b. A flow outlet 110c is defined in a center of an upper surface of the upper case 110a. A flow inlet 110 is positioned in a center of a lower end of the lower case 110b. A communication passage 120 extends in a vertical direction between an inner wall surface of the lower case 110b and an outer peripheral portion of the holder 111 that faces the inner wall surface of the lower case 110b.

As illustrated in FIG. 10, the fixed valve 112 is supported by the holder 111 in a swingable manner while its upper end is exposed. The fixed valve 112 is biased upward by a spring 112a interposed between the holder 111 and the fixed valve 112. The movable valve 113 includes a tubular valve main body 113a with a valve hole 130 extending in the vertical direction and a circular ring-shaped clamp member 113c fitted to a lower portion of the valve main body 113a. A clamp portion 113b extending radially outward like a flange is integrally formed with an upper area of the valve main body 113a. An outer peripheral portion of the diaphragm 114 is clamped between the upper case 110a and the lower case 110b. An inner peripheral portion of the diaphragm 114 is clamped between the clamp member 113c and the clamp portion 113b of the valve main body 113a. The diaphragm 114 partitions the interior space of the casing 110 into a lower pressure chamber 122 and an upper back pressure chamber 124. The movable valve 113 is biased downward (in the closing direction) by a spring member 115. The spring member 115 is interposed between an upper surface portion of the upper case 110a and an upper portion of the valve main body 113a that faces the upper surface portion.

Referring still to FIG. 10, the movable valve 113 may be removed from the fixed valve 112 against the biasing force of the spring member 115 when fuel pressure in the pressure chamber 122 communicating with the flow inlet 110d exceeds a predetermined pressure, thereby opening the pressure regulating valve 100. As a result, the fuel in the pressure chamber 122 flows through the valve hole 130 of the valve main body 113a into the back pressure chamber 124, and then flows out through the flow outlet 110c. The movable valve 113 is seated on the fixed valve 112 due to the biasing force of the spring member 115 when the fuel pressure in the pressure chamber 122 becomes lower than the predetermined pressure, thereby closing the pressure regulating valve 100. In this way, the fuel pressure in the pressure chamber 122 may be regulated to and maintained at the predetermined pressure.

In the fuel supply device, the pressure regulating valve 100 is disposed on the downstream side of the fuel pump that supplies fuel. In this arrangement, when foreign substances (such as a powder or the like caused by abrasion at a sliding portion) are generated in the fuel pump, such foreign substances may get caught between the fixed valve 112 and the movable valve 113. It may be possible to provide a filter member, such as a mesh, for filtering fuel in order to prevent the foreign substances from entering the pressure chamber 122 through the flow inlet 110d. However, the pressure of the fuel at the entrance of the pressure chamber 122 may dislodge the filter member in an axial direction and/or a radial direction. When the filter member is dislodged, fuel may enter the pressure chamber 122 without being filtered. Therefore, the benefit of providing the filtering member may be lost.

BRIEF SUMMARY

According to one aspect of the present disclosure, a pressure regulating valve includes a casing having a flow inlet at one end and a flow outlet at the other end, and a holder disposed within the casing and fixed to an inner peripheral wall of the casing. A communication passage may be defined between the inner peripheral wall of the casing and an outer peripheral wall of the holder. A fixed valve may be disposed on the holder. A movable valve may be seated on and removed from the fixed valve and include a valve hole. When the pressure of fluid flowing from the flow inlet into the casing is equal to or higher than a predetermined pressure, the movable valve is removed from the fixed valve so that the fluid flows through the valve hole toward the flow outlet. A movable partition wall may be provided between the casing and the movable valve. The movable partition wall is configured to partition an interior of the casing into a pressure chamber on the holder side and a back pressure chamber on the flow outlet side. A biasing member biases the movable valve in a closing direction oriented toward the fixed valve. A filter filters fluid entering from the flow inlet of the casing into the pressure chamber. The filter includes a filtering part for filtering fluid and a holding part having a frame part serving to hold an outer peripheral portion of the filtering part. An alignment structure for aligning the holding part at a predetermined position is provided between the holding part of the filter and the holder or between the holding part of the filter and the casing.

The alignment structure serves to align the holding part of the filter at the predetermined position. This arrangement offers the potential to prevent the filter from being dislodged or displaced with respect to the casing. As a result, the filter may reliably prevent the entrance of the foreign substances into the pressure chamber of the pressure regulating valve.

According to another aspect of the present disclosure, the alignment structure includes a projection provided at one of the holding part of the filter or the holder and a recess provided at the other one of the holding part or the holder into which the projection is engaged. Therefore, the engagement of the projection into the recess may prevent displacement which may be caused between both of these members. The alignment structure includes an outer peripheral surface of the holding part of the filter and an inner peripheral surface of the casing facing the outer peripheral surface. As a result, radial movement of the filter may be restricted by the casing.

According to another aspect of the present disclosure, the alignment structure includes a projection provided on a center of the holding part of the filter and a recess into which the projection is engaged. The recess is provided at an end of the holder facing the filter. Due to the engagement of the projection and the recess, movement of the holding part toward the holder side and radial movement of the projection of the holding part may be restricted, and a predetermined interval is defined between the frame part of the holding part and the holder. Consequently, cross-sectional dimension of the passage between the frame part and the holder may be increased and reduction of pressure loss may be prevented.

According to another aspect of the present disclosure, the movable valve includes a valve main body defining the valve hole and a movable partition wall clamp portion for clamping an inner peripheral portion of the movable partition wall. The movable partition wall clamp portion includes a first piece portion facing a first surface of the movable partition wall and a second piece portion facing a second surface of the movable partition wall on the opposite side of the first surface.

According to another aspect of the present disclosure, the movable partition wall is a diaphragm. A stepped portion having a height corresponding to a thickness of the diaphragm is formed at one of the first piece portion or the second piece portion. The other one of the first piece portion or the second piece portion abuts the stepped portion. The first piece portion and the second piece portion clamp the inner peripheral portion of the diaphragm in a compressed state. In this way, the diaphragm can be held at a predetermined pressure.

According to another aspect of the present disclosure, the first piece portion and the second piece portion are integrally formed with the valve main body. As a result, the number of components of the pressure regulating valve can be reduced.

DETAILED DESCRIPTION

A pressure regulating valve according to the present exemplary embodiment may be employed to a fuel supply device that feeds fuel from a fuel tank to an internal combustion engine (engine). The pressure regulating valve serves to regulate pressure of fuel discharged out of a fuel pump at a predetermined pressure. For purposes of further explanation, up and down, left and right are defined in FIG. 1, however, such directions as defined in FIG. 1 do not necessarily specify the orientation of the pressure regulating valve once installed or during use.

Figure 1:
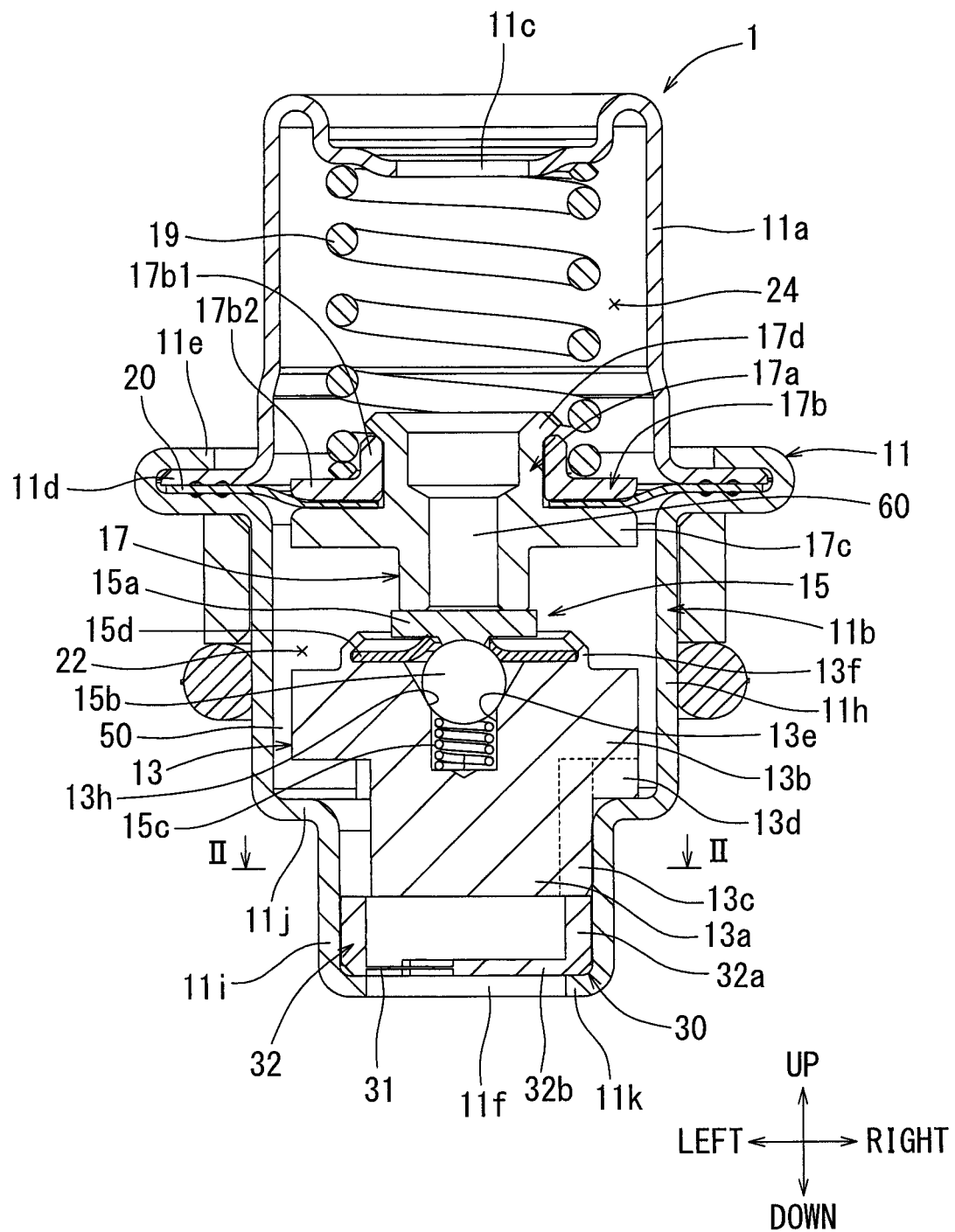
FIG. 1 is a cross-sectional view of a pressure regulating valve according to one exemplary embodiment.

Referring now to FIG. 1, the pressure regulating valve 1 includes a casing 11, a holder 13, a fixed valve 15, a movable valve 17, a spring member 19 (also referred to as a biasing member or biasing means), a diaphragm 20 (also referred to as a movable partition wall), and a filter 30.

As illustrated in FIG. 1, the casing 11 constitutes an outer shell or housing of the pressure regulating valve 1 and includes an upper case 11a and a lower case 11b, which define an upper part and a lower part of the casing 11. The upper case 11a is made of, for example, metal and has a tubular shape. An upper end (one end) of the upper case 11a includes a first portion bent inward in a radial direction, a second portion bent downward from the leading end of the first portion, a third portion bent inward in a radial direction from the leading end of the second portion and a flow outlet 11c defined in the third portion. The lower end (the other end) of the upper case 11a includes a locking portion 11d bent outward in a radial direction.

The lower case 11b is made of, for example, metal and has a stepped cylindrical shape. The lower case 11b includes an upper large diameter tubular portion 11h, a lower small diameter tubular portion 11i, and a stepped portion 11j. A lower end 11k of the lower small diameter tubular portion 11i is bent inward in a radial direction and a flow inlet 11f is provided in the lower end 11k. A receiving portion 11e having a laterally oriented U-shaped cross-section is formed at the upper end (one end) of the large diameter tubular portion 11h. The receiving portion 11e includes a first portion bent outward in a radial direction from the upper end of the large diameter tubular portion 11h, a second portion bent upward from the leading end of the first portion, and a third portion bent inward in a radial direction from the leading end of the second portion, thereby forming the U-shaped cross-section. The receiving portion 11e has an annular shape with an opening in the center. The receiving portion 11e is formed by being caulked (e.g., crushed or deformed) so as to form the second portion and the third portion while the locking portion 11d of the upper case 11a is seated on the first portion of the receiving portion 11e. As a result, the upper case 11a and the lower case 11b are connected. The stepped portion 11j extends inward in a radial direction from the lower end of the large diameter tubular portion 11h to the upper end of the small diameter tubular portion 11i.

Figure 2:
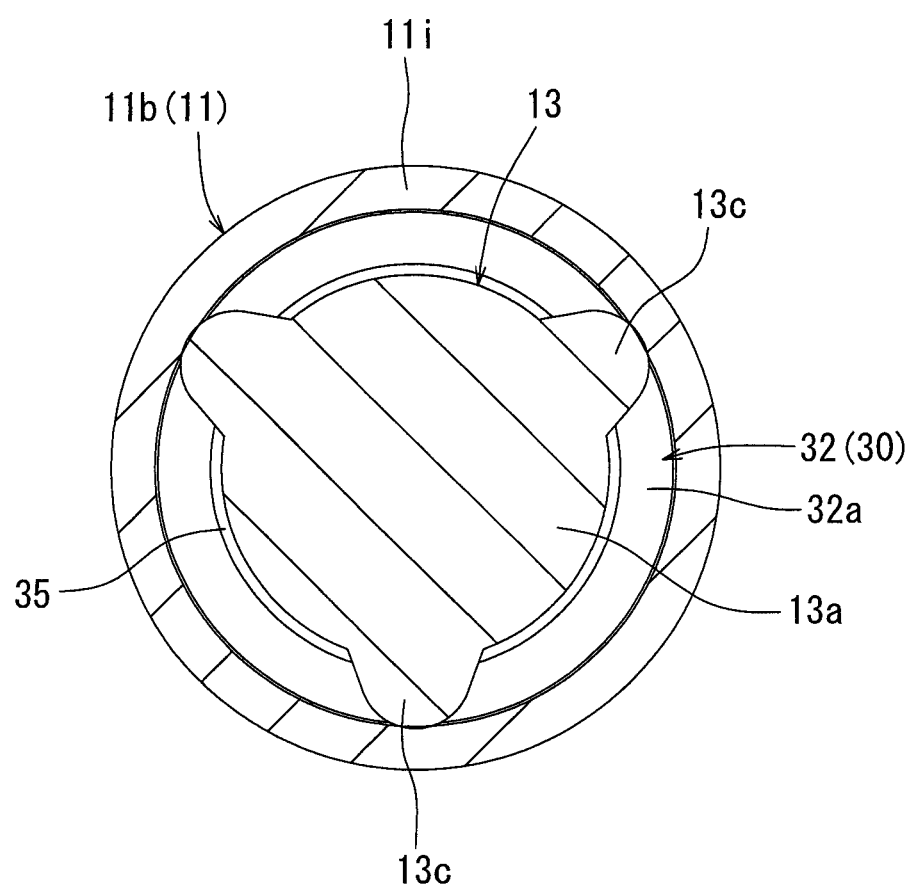
FIG. 2 is a cross-sectional view of the pressure regulating valve of FIG. 1 taken along line II-II in FIG. 1.
Figure 3:
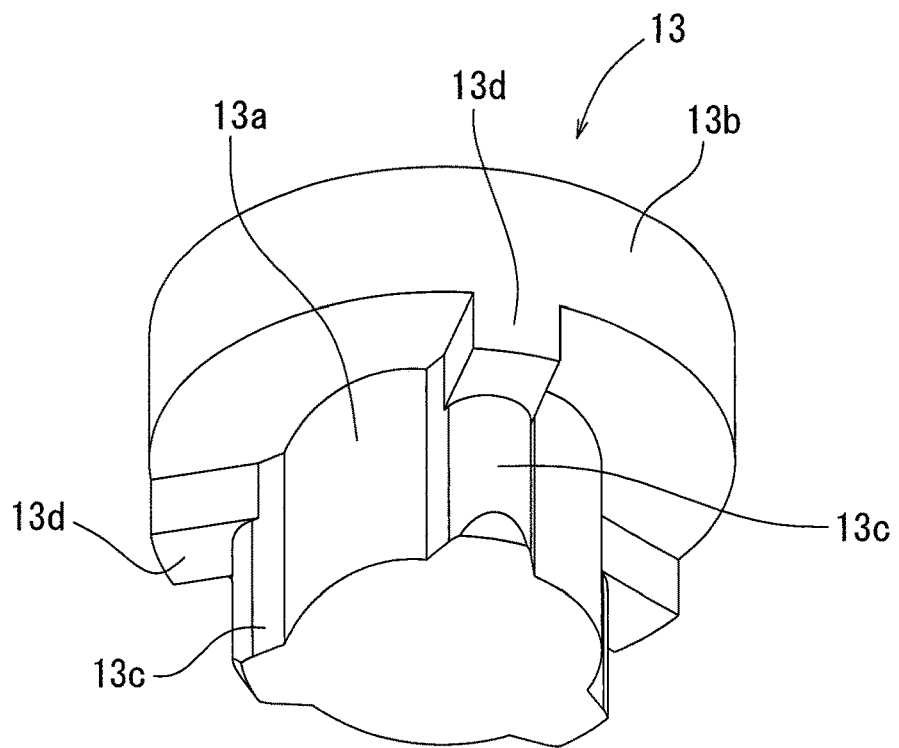
FIG. 3 is a perspective view of the holder of the pressure regulating valve of FIG. 1.

Referring now to FIG. 3, the holder 13 is made of, for example, metal and has a stepped columnar shape. The holder 13 has a lower small diameter columnar portion 13a and an upper large diameter columnar portion 13b. The lower small diameter columnar portion 13a and the upper large diameter columnar portion 13b are concentrically arranged. A plurality of (for example, three) circumferentially-spaced abutment portions 13c extend outward in a radial direction from an outer peripheral surface of the small diameter columnar portion 13a at predetermined intervals in the circumferential direction, for example, at equal intervals. The abutment portions 13c have a semi-circular cross-section (see FIG. 2) and extend in an axial direction along the small diameter columnar portion 13a. Rectangular prismatic stopper portions 13d are formed at an inner corner portion defined between each of the abutment portions 13c and the large diameter cylindrical portion 13b and extend outward in a radial direction therefrom.

As illustrated in FIG. 1, a receiving hole 13e having a cylindrical shape with a bottom is provided in the center of the upper end of the large diameter columnar portion 13b of the holder 13. A tapered hole 13h is formed at an upper end opening of the receiving hole 13e and has an inner diameter that gradually increases moving in an upward direction. A cylindrical valve attachment portion 13f is formed on the upper surface of the large diameter columnar portion 13b, and is concentrically aligned with the large diameter columnar portion 13b. The inner diameter of the valve attachment portion 13f is reduced as its upper part is deformed toward the central axis so as to hold a lock plate 15d of the fixed valve 15.

The holder 13 is positioned within the lower case 11b. Specifically, the plurality of the abutment portions 13c of the small diameter columnar portion 13a are press-fitted in the small diameter tubular portion 11i. The plurality of stopper portions 13d are seated on the stepped portion 11j. Consequently, the holder 13 is arranged at a predetermined position in the lower case 11b. The large diameter columnar portion 13b of the holder 13 has an outer diameter that is smaller than the inner diameter of the large diameter tubular portion 11h of the lower case 11b. Therefore, a communication passage 50 for vertical fluid communication is provided between the lower case 11b and the holder 13. The communication passage 50 includes: a plurality of circumferentially-spaced first passage portions positioned between the small diameter tubular portion 11i and the plurality of the circumferentially adjacent abutment portions 13c, wherein the first passage portions extend in an axial direction; a plurality of circumferentially-spaced second passage portions positioned between the large diameter columnar portion 13b, the stepped portion 11j, and the plurality of the stopper portions 13d, wherein the second passage portions extend in a radial direction; and a third passage portion positioned between the large diameter tubular portion 11h and the large diameter columnar portion 13b, wherein the third passage portion extends in an axial direction.

As illustrated in FIG. 1, the fixed valve 15 includes a valve seat 15a and a spherical body 15b. The valve seat 15a is made of, for example, metal and has a disc shape. The spherical body 15b is made of, for example, metal and has a spherical shape. The spherical body 15b is joined to the center of the lower surface of the valve seat 15a. A lock plate 15d is interposed between the valve seat 15a and the spherical body 15b. The lock plate 15d is made of, for example, metal and has an annular plate shape. An inner edge of the lock plate 15d is tapered such that the inner diameter of the lock plate 15d is gradually reduced moving in an upward direction.

As illustrated in FIG. 1, the fixed valve 15 is provided at the upper end of the holder 13. More specifically, the spherical body 15b is installed in a tapered hole portion 13h of the holder 13 such that the upper part of the spherical body 15b extends above the upper end of a tapered hole 13h. The lock plate 15d is inserted into the valve attachment portion 13f of the holder 13. An upper part of the spherical body 15b is inserted into the central hole of the lock plate 15d. The valve attachment portion 13f is deformed such that the upper part of the valve attachment portion 13f is positioned radially inward when the spherical body 15b and the lock plate 15d are inserted into the valve attachment portion 13f. In this way, the lock plate 15d is held by the holder 13. The spherical body 15b is rotatably held about the center of the spherical body 15b between the opening edge of the lock plate 15d and the tapered hole 13h of the holder 13. Therefore, the fixed valve 15 is rotatable relative to the holder 13. A spring 15c made of, for example, metal is seated in the receiving hole 13e of the holder 13. The spring 15c biases the fixed valve 15 in an upward direction.

Referring still to FIG. 1, the movable valve 17 includes a valve main body (valve main body portion) 17a and a clamp member 17b. The valve main body 17a is made of, for example, metal and has a cylindrical shape. The valve main body 17a is hollow and has a valve hole 60 extending in a vertical direction therethrough. A clamp portion 17c extending radially outward like a flange is integrally formed at the vertical center of the valve main body 17a. A tapered caulking portion 17d has an inner diameter and an outer diameter that gradually increases in an upward direction, and is positioned at the upper end of the valve main body 17a. The caulking portion 17d is caulked (e.g., crushed or deformed) after the diaphragm 20 and the clamp member 17b are fitted to the upper portion of the valve main body 17a.

The clamp member 17b is made of, for example, metal and has an annular shape. The clamp member 17b has an L-shaped cross-section that includes a cylindrical tubular portion 17b1 and a flange portion 17b2 extending radially outward from the lower end of the tubular portion 17b1.

As illustrated in FIG. 1, the diaphragm (movable partition wall) 20 has an annular plate shape and is made of, for example, a rubber-like elastic material having flexibility and resiliency. The diaphragm 20 is fitted on the top of the valve main body 17a before the caulking portion 17d of the valve main body 17a is formed. The tubular portion 17b1 of the clamp member 17b is fitted into the valve main body 17a from the top. Subsequently, the upper part of the valve main body 17a is deformed due to caulking or the like, and the caulking portion 17d is formed at the upper part of the valve maim body 17a. As a result, the inner peripheral portion of the diaphragm 20 is clamped between the clamp portion 17c of the valve main body 17a and the clamp member 17b. In other words, the clamp member (piece portion) 17b and the clamp portion (piece portion) 17c constitute a movable partition wall clamp portion. The outer peripheral portion of the diaphragm 20 is clamped between the upper case 11a and the lower case 11b. The diaphragm 20 divides the interior space of the casing 11 into the lower pressure chamber 22 and the upper back pressure chamber 24.

As illustrated in FIG. 1, the spring member 19 is, for example, a metal coil spring. The spring member 19 is interposed between the facing surfaces of the upper end wall (opening edge of the flow outlet 11c) of the upper case 11a and the flange portion 17b2 of the clamp member 17b of the movable valve 17. The spring member 19 biases the movable valve 17 in a closing direction (downward). Due to the biasing force of the spring member 19, the valve main body 17a of the movable valve 17 is held against the valve seat 15a of the fixed valve 15. As a result, the valve hole 60 is closed, and the valve closed state can be maintained.

Figure 4:
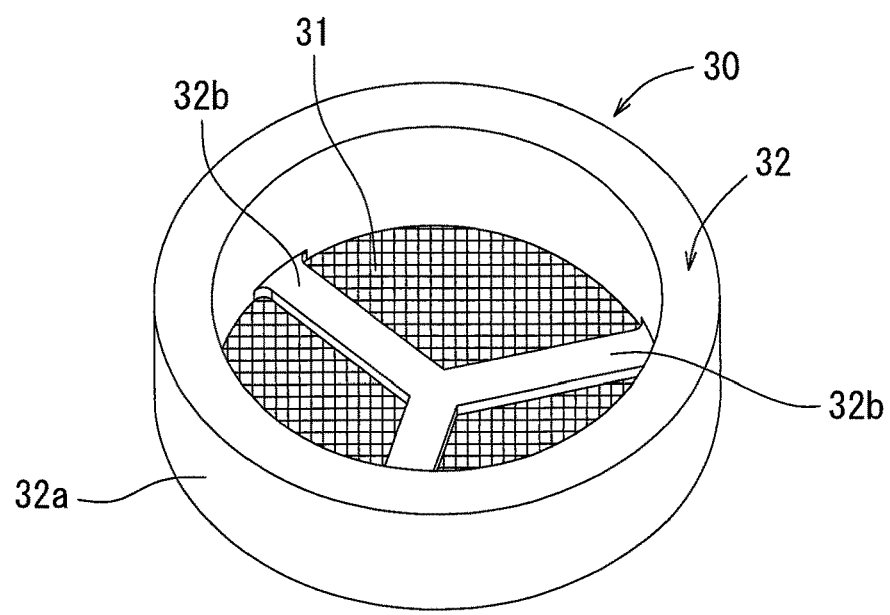
FIG. 4 is a perspective view of the filter of the pressure regulating valve of FIG. 1.

As illustrated in FIG. 1, the filter 30 serves to filter fuel flowing from the flow inlet 11f of the casing 11 into the pressure chamber 22. As illustrated in FIG. 4, the filter 30 is made of, for example, resin and includes a holding part 32 and a plurality of (for example, three) filtering parts 31. The holding part 32 includes a frame part 32a having a cylindrical shape and a plurality of (for example, three) crosspiece parts 32b extending radially from the lower end of the frame part 32a. Each of the filtering parts 31 is mesh-like structure attached to the lower surface of the frame part 32a. Each of the filtering parts 31 covers one of openings enclosed by the frame part 32a and each of the crosspiece parts 32b. The plurality of the filtering parts 31 may be separate members or one member.

As illustrated in FIG. 1, the filter 30 and the holder 13 are sequentially inserted from the top of the lower case 1ib. The frame part 32a of the filter 30 is fitted into the small diameter tubular portion 11i of the lower case 11b with almost no gap in the radial direction. Therefore, due to collaboration of the small diameter tubular portion 11i with the frame part 32a, movement of the holding part 32 of the filter 30 in a radial direction is restricted and/or prevented (radial alignment structure, radial alignment means). The lower end of the frame part 32a of the filter 30 abuts the upper surface of the lower end 11k of the small diameter tubular portion 11i. A plurality of the abutment portions 13c of the holder 13 are abutted against the upper end of the frame part 32a. Accordingly, axial movement of the holding part 32 is restricted and/or prevented by the lower end 11k of the small diameter tubular portion 11i and the abutment portion 13c of the holder 13 (axial alignment structure, axial alignment means).

As illustrated in FIG. 2, the inner diameter of the frame part 32a is larger than the outer diameter of the small diameter columnar portion 13a. Therefore, a gap 35 to allow fuel to flow therethrough is provided between the frame part 32a and the small diameter columnar portion 13a. As illustrated in FIG. 1, the axial height of the frame part 32a is greater than the axial height of the crosspiece parts 32b. Consequently, a gap to allow fuel to flow therethrough is provided between the lower surface of the holder 13 and the crosspiece parts 32b.

As illustrated in FIG. 1, fuel flowing into the pressure chamber 22 from the flow inlet 11f is filtered as the fuel flows through each of the filtering parts 31 of the filter 30. The filtered fuel flows through the communication passage 50. When fuel pressure in the pressure chamber 22 exceeds the predetermined pressure, the valve main body 17a of the movable valve 17 is removed from the valve seat 15a of the fixed valve 15 against the biasing force of the spring member 19. As a result, the pressure regulating valve 1 is opened so that fuel in the pressure chamber 22 flows through the valve hole 60 of the valve main body 17a into the backpressure chamber 24. Further, fuel is discharged through the flow outlet 11c out of the pressure regulating valve 1. When fuel pressure in the pressure chamber 22 is reduced below the predetermined pressure, the valve main body 17a of the movable valve 17 seats against the valve seat 15a of the fixed valve 15 due to the biasing force of the spring member 19. Consequently, the pressure regulating valve 1 is closed. In this way, the fuel pressure in the pressure chamber 22 is regulated to and maintained at predetermined pressure.

According to the above pressure regulating valve 1, the holding part 32 is aligned in a predetermined way due to the alignment structure (axial alignment structure and radial alignment structure) provided by the lower case 11b of the casing 11, the small diameter columnar portion 13a of the holder 13 (including plurality of abutment portions 13c), and the frame part 32a of the holding part 32 of the filter 30. Accordingly, an axial (vertical) position and a radial (lateral) position of the filter 30 with respect to the casing 11 is maintained. This offers the potential to prevent the filter 30 from being displaced and foreign substances from entering the pressure chamber 22.

As illustrated in FIG. 1, the clamp portion 17c of the movable valve 17 is a movable partition wall clamp portion for holding the inner peripheral portion of the diaphragm (movable partition wall) 20. The clamp portion 17c is integrally formed with the valve main body 17a. Accordingly, the number of components for the pressure regulating valve 1 can be reduced as compared with the case where the clamp portion 17c and the valve main body 17a are separate members.

The pressure regulating valve may have a configuration illustrated in FIGS. 5 to 8 alternative to the configuration illustrated in FIGS. 1 to 4. The pressure regulating valve 2 illustrated in FIGS. 5 to 8 has a holder 14 in FIG. 7 and a filter 40 in FIG. 8 alternative to the holder 13 in FIG. 3 and the filter 30 in FIG. 4, respectively. Hereinafter, the distinctions between the pressure regulating valve 1 in FIG. 1 and the pressure regulating valve 2 in FIG. 5 will be described, whereas the same portions are denoted by the same reference numerals and description thereof will be omitted.

Figure 7:
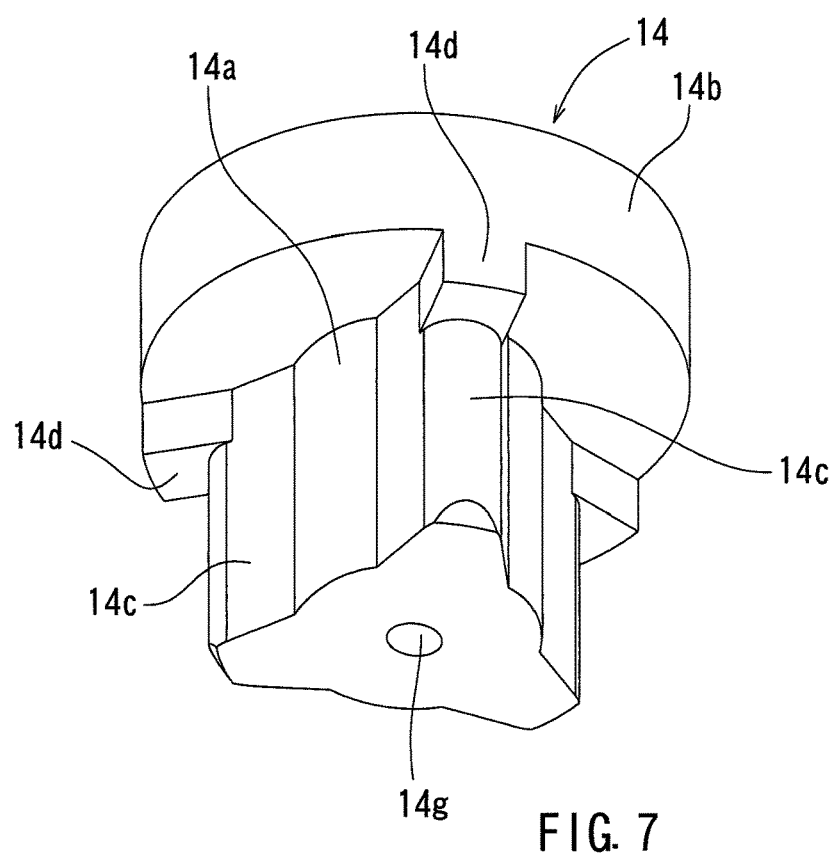
FIG. 7 is a perspective view of the holder of the pressure regulating valve of FIG. 5.

As illustrated in FIG. 7, the holder 14 includes a small diameter columnar portion 14a, a large diameter columnar portion 14b, abutment portions 14c, and stopper portions 14d. These are configured similar to the small diameter columnar portion 13a, the large diameter columnar portion 13b, the abutment portion 13c, and the stopper portion 13d in FIG. 3, respectively. A receiving hole 14e similar to the receiving hole 13e in FIG. 1 is formed in the upper center of the large diameter columnar portion 14b of FIG. 5. An alignment hole (recess) 14g having a cylindrical shape with a top is concentrically formed in the center of the lower end of the small diameter columnar portion 14a in FIG. 5.

Figure 8:
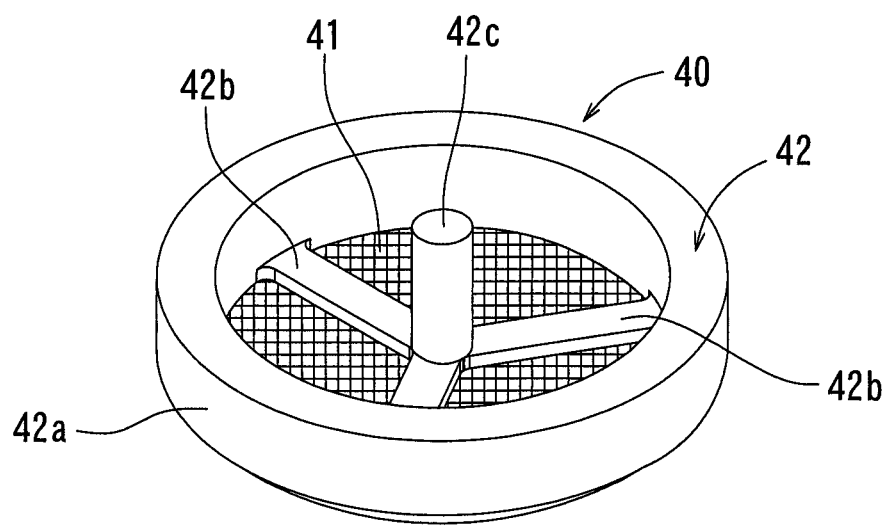
FIG. 8 is a perspective view of the filter of the pressure regulating valve of FIG. 5.

As illustrated in FIG. 8, the filter 40 includes a holding part 42 and filtering parts 41 similar to the holding part 32 and the filtering parts 31 in FIG. 4. The holding part 42 includes a frame part 42a and crosspiece parts 42b similar to the frame part 32a and the crosspiece parts 32b in FIG. 4. An alignment column (projection) 42c with a columnar shape is concentrically formed on the center (intersection) of the plurality of the crosspiece parts 42b.

Figure 5:
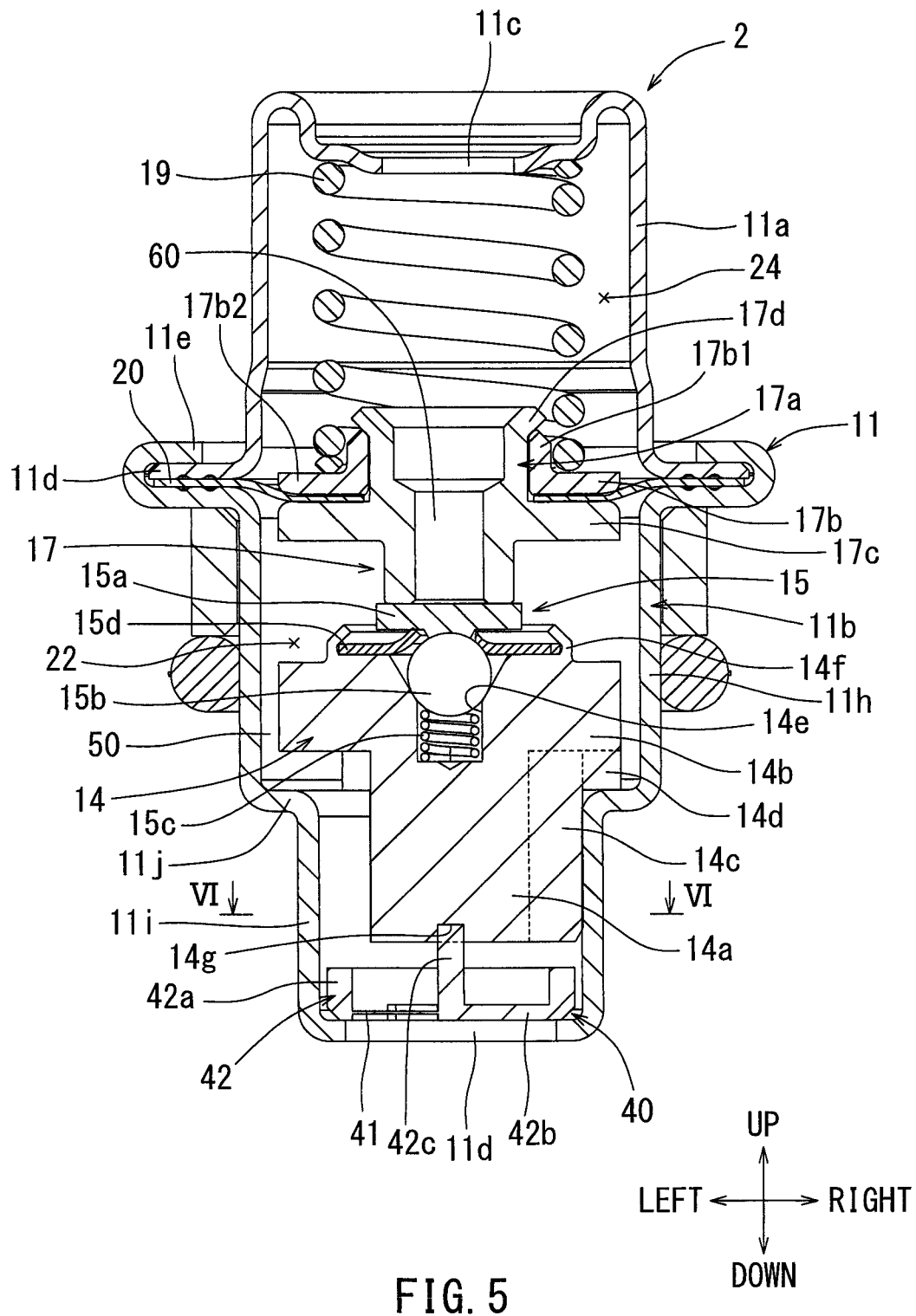
FIG. 5 is a cross-sectional view of a pressure regulating valve according to another exemplary embodiment.

As illustrated in FIG. 5, the holder 14 and the filter 40 are disposed within the casing 11 similar to the holder 13 and the filter 30 in FIG. 1. The upper end of the alignment column 42c of the filter 40 is fitted or engaged into the alignment hole 14g of the holder 14 with almost no gap. The upper end face of the alignment column 42c is abutted to the upper surface of the alignment hole 14g. In this way, the alignment hole 14g and the alignment column 42c serve as an alignment structure for aligning the position of the filter 40 with respect to the holder 14 in axial and radial directions.

Figure 6:
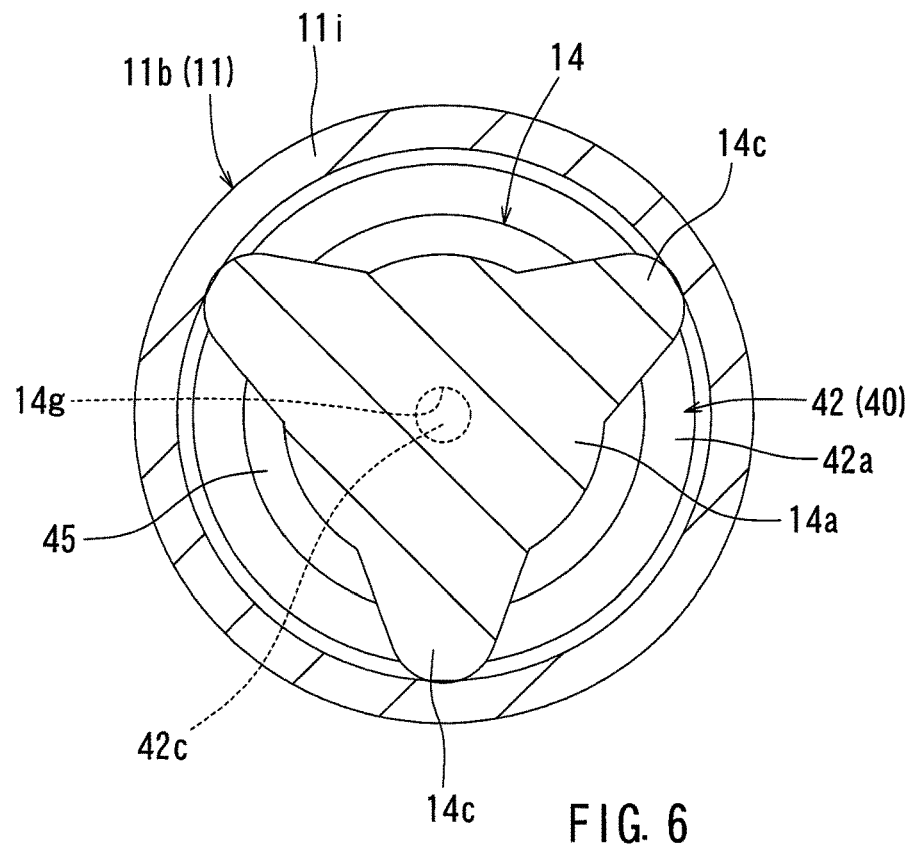
FIG. 6 is a cross-sectional view of the pressure regulating valve of FIG. 5 taken along line VI-VI in FIG. 5.

The small diameter columnar portion 14a of the holder 14 in FIG. 7, has a diameter smaller than that of the small diameter columnar portion 13a in FIG. 3. Therefore, the gap between an outer peripheral surface of the small diameter columnar portion 14a and an inner peripheral surface of the small diameter tubular portion 11i in FIG. 6 is greater than the gap between the outer peripheral surface of the small diameter columnar portion 13a and the inner peripheral surface of the small diameter tubular portion 11i in FIG. 1, while the cross-sectional area of the passage is greater. The gap 45 between the outer peripheral surface of the small diameter columnar portion 14a and the inner peripheral surface of the frame part 42a of the filter 40 of FIG. 6 is also greater than the gap 35 between the outer peripheral surface of the small diameter columnar portion 13a and the inner peripheral surface of the frame part 32a of the filter 30 of FIG. 2. The height of the frame part 42a of the filter 40 of FIG. 8 is lower than that of the frame part 32a of FIG. 4. Therefore, the axial gap between the frame part 42a and the holder 14 (specifically, the small diameter columnar portion 14a and the abutment portion 14c) of FIG. 5 is greater than the axial gap between the frame part 32a and the holder 13 of FIG. 1.

As illustrated in FIG. 5, the alignment column 42c is provided at the holding part 42 of the filter 40. The alignment hole 14g in which the alignment column 42c is engaged is provided in the holder 14. The engagement of the alignment column 42c in the alignment hole 14g may prevent the filter 40 from being dislodged from the holder 14.

As illustrated in FIG. 5, the alignment column 42c is located on the central axis of the holding part 42 of the filter 40. The alignment hole 14g is provided at an end face (lower surface) facing the filter 40. The engagement of the alignment column 42c into the alignment hole 14g may prevent the holding part 42 from shifting with respect to the holder 14 in the radial direction. Further, a predetermined spacing may be formed between the frame part 42a of the holding part 42 and the holder 14. Consequently, a cross-sectional area of the passage between the frame part 42a and the holder 14 may be increased so that pressure losses may be reduced.

Figure 9:
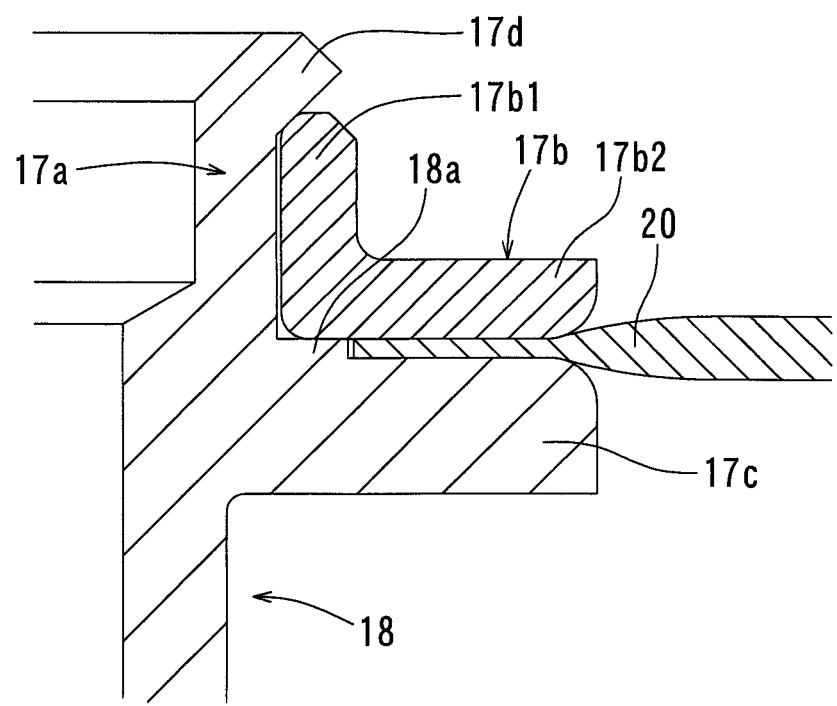
FIG. 9 is a partial cross-sectional view of a pressure regulating valve according to another exemplary embodiment.
Figure 10:
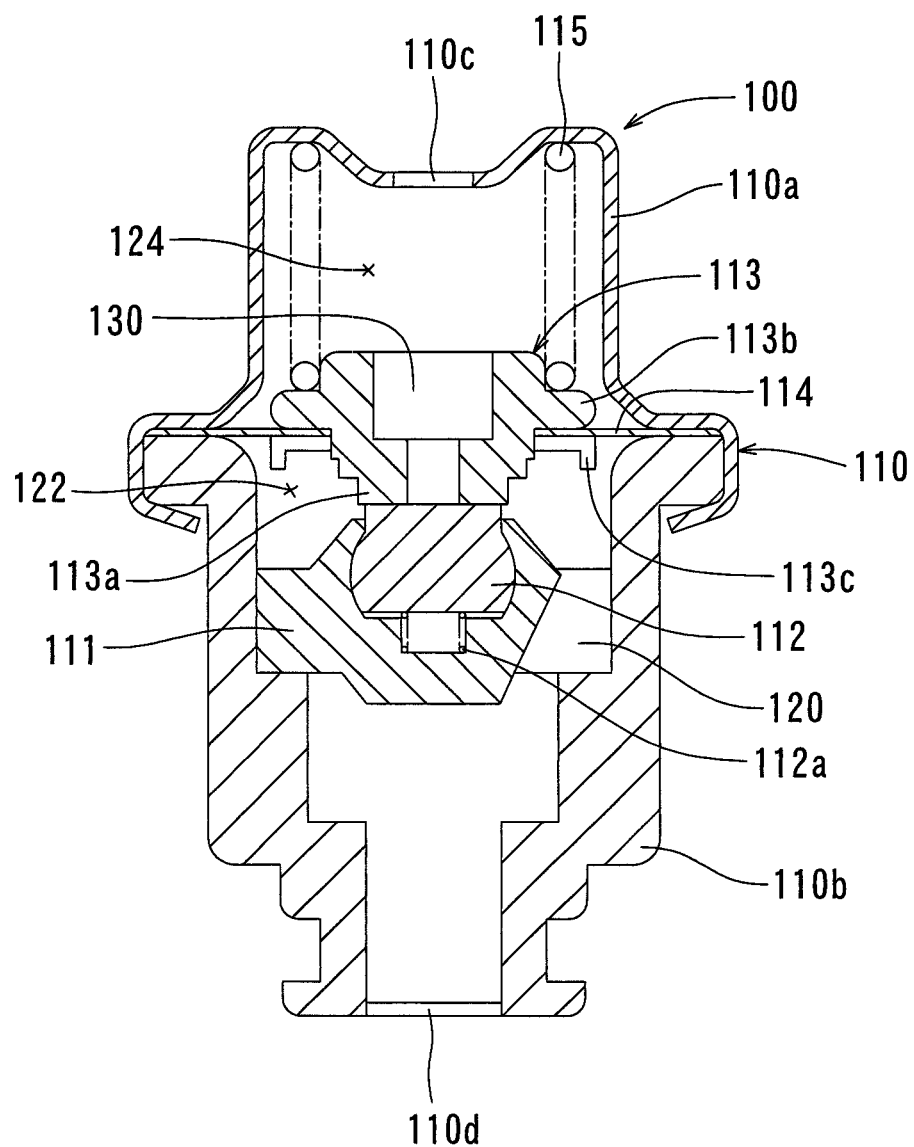
FIG. 10 is a cross-sectional view of a conventional pressure regulating valve.

The pressure regulating valve 1, 2 may include a movable valve 18 illustrated in FIG. 9, alternative to the movable valve 17 illustrated in FIGS. 1 and 5. Since the basic configuration of the movable valve 18 is the same as that of the movable valve 17, the same parts are denoted by the same reference numerals and description thereof is omitted.

As illustrated in FIG. 9, the movable valve 18 includes a stepped portion 18a having an annular shape at an upper inner corner defined by the valve main body 17a and the clamp portion 17c. The height of the stepped portion 18a is determined such that the inner peripheral portion of the diaphragm 20 is compressed and clamped between the clamp portion 17c and the flange portion 17b2 of the clamp member 17b. Specifically, the height of the stepped portion 18a is lower than the thickness of the inner peripheral portion of the diaphragm 20 in a free state. On the other hand, the height of the stepped portion 18a is high enough to allow the stepped portion 18a and the clamp member 17b to abut the inner peripheral portion of the diaphragm 20 to compress and deform the inner peripheral portion of the diaphragm 20.

As illustrated in FIG. 9, after the diaphragm 20 and the clamp member 17b are fitted to the valve main body 17a, the upper part of the valve main body 17a is deformed such that the caulking portion 17d is formed. The caulking portion 17d pushes the clamp member 17b toward the clamp portion 17c, thereby causing the clamp member 17b to push on the diaphragm 20. The clamp member 17b is abutted against the stepped portion 18a such that the inner peripheral portion of the diaphragm 20 is clamped in a compressed state between the clamp member 17b and the clamp portion 17c. The caulking portion 17b is formed by deforming the upper part of the valve main body 17a. Consequently, there may be irregularities in size of the caulking portion 17d. However, the stepped portion 18a restricts the axial movement of the clamp member 17b. Therefore, the stepped portion 18a reduces the unevenness caused by any irregularities in the compression caused by the clamp member 17b compressing the diaphragm 20. As a result, the inner peripheral portion of the diaphragm 20 is clamped at predetermined pressure between the clamp member 17b and the clamp portion 17c such that excessive compression of the diaphragm 20 is reduced.

The present disclosure shall not be limited to the above exemplary embodiments and various modifications may be made as described below. For example, the pressure regulating valve is not limited to regulate pressure of fuel but may also be used for regulating pressure of various other fluid such as liquid or gas. The alignment structure of the filters 30, 40 with respect to the casing 11 is provided between the casing 11 and the holding parts 32, 42 of the filters 30, 40 as well as between the holders 13, 14 and the holding parts 32, 42 of the filters 30, 40. Arrangement and shape of the alignment structure shall not be limited to the above exemplary embodiments.

As illustrated in FIG. 5, the alignment hole 14g is provided in the holder 14 while the alignment column 42c is provided at the filter 40. Alternatively, the alignment hole may be provided in the filter while the alignment column may be provided at the holder. As illustrated in FIG. 9, the stepped portion 18a is provided at the valve main body 17a. Alternatively, a stepped portion may be provided at the clamp member 17b.

As illustrated in FIG. 1, the movable valve 17 includes a valve main body 17a and a clamp portion 17c that are made of one member as well as a clamp member 17b made of another member. Alternatively, the movable valve 17 may include a valve main body 17a and a clamp member 17b that are made of one member as well as a clamp portion 17c made of another member. Alternatively, the movable valve 17 may include a clamp portion 17c and a clamp member 17b each of that is formed of a separate member from that of the valve main body 17a. When the clamp portion 17c is a separate member from the valve main body 17a, the stepped portion, which is formed similar to the stepped portion 18a illustrated in FIG. 9, may be formed at the clamp portion 17c or the clamp member 17b facing the clamp portion 17c.

The various examples described above in detail with reference to the attached drawings are intended to be representative of the invention and are thus non limiting embodiments. The detailed description is intended to teach a person of skill in the art to make, use, and/or practice various aspects of the present teachings and thus does not limit the scope of the invention in any manner. Furthermore, each of the additional features and teachings disclosed above may be applied and/or used separately or with other features and teachings in any combination thereof, to provide improved pressure regulating valve and/or methods of making and using the same.

The invention claimed is:

1. A pressure regulating valve, comprising:
a casing having a flow inlet at a first end and a flow outlet at a second end opposite the first end;
a holder disposed within the casing and fixably coupled to an inner peripheral wall of the casing;
a communication passage positioned between the inner peripheral wall of the casing and an outer peripheral wall of the holder;
a fixed valve disposed on the holder;
a movable valve having a valve hole, wherein the movable valve has a closed position seated on the fixed valve and an open position removed from the fixed valve, wherein the movable valve is configured to transition from the closed position to the open position when pressure of fluid flowing from the flow inlet into the casing is equal to or greater than a predetermined pressure to allow the fluid to flow through the valve hole toward the flow outlet;

a movable partition wall positioned between the casing and the movable valve, wherein the movable partition wall divides an interior of the casing into a pressure chamber on the holder side and a back pressure chamber on the flow outlet side;

a biasing member configured to bias the movable valve to the closed position; and a filter configured to filter fluid entering from the flow inlet of the casing into the pressure chamber, wherein:
the filter includes a filtering part configured to filter fluid and a holding part having a frame part configured to hold an outer peripheral portion of the filtering part, wherein the filtering part is oriented perpendicular to a central axis of the flow inlet of the casing such that fluid flows axially through the flow inlet and filtering part, and an alignment structure configured to align the holding part at a predetermined position is provided between the holding part of the filter and the holder or between the holding part of the filter and the casing.

2. The pressure regulating valve of claim 1, wherein the alignment structure includes a projection at one of the holding part of the filter or the holder and a recess into which the projection is disposed, wherein the recess is provided at the other one of the holding part or the holder.

3. The pressure regulating valve of claim 1, wherein the alignment structure includes a projection provided the holding part of the filter and a recess into which the projection is disposed, wherein:
the recess is provided at an end of the holder facing the filter, due to the engagement of the projection into the recess, movement of the holding part toward the holder side and radial movement of the projection of the holding part is restricted, and
a predetermined interval is defined between the frame part of the holding part and the holder.

4. The pressure regulating valve of claim 1, wherein the alignment structure includes an outer peripheral surface of the holding part of the filter configured to contact an inner peripheral surface of the casing facing the outer peripheral surface.

5. The pressure regulating valve of claim 1, wherein the movable valve includes a valve main body defining the valve hole, and a movable partition wall clamp portion configured to clamp an inner peripheral portion of the movable partition wall, wherein
the movable partition wall clamp portion includes a first piece portion facing a first surface of the movable partition wall and a second piece portion facing a second surface of the movable partition wall on the opposite side of the first surface.

6. The pressure regulating valve of claim 5, wherein the movable partition wall is a diaphragm, and wherein:
a stepped portion having a height is formed at one of the first piece portion or the second piece portion,
the other one of the first piece portion or the second piece portion abuts the stepped portion,
the first piece portion and the second piece portion clamp the inner peripheral portion of the diaphragm in a compressed state, and
the height of the stepped portion is the same as the diaphragm in the compressed state.

7. The pressure regulating valve of claim 5, wherein the first piece portion and the second piece portion are formed as one piece with the valve main body.

8. A pressure regulating valve, comprising:
a casing;
a holder disposed within the casing and fixably coupled to an inner peripheral wall of the casing;
a communication passage between the inner peripheral wall of the casing and an outer peripheral wall of the holder;
a movable partition wall disposed within the casing and affixed to the inner peripheral wall of the casing, wherein the movable partition wall partitions an interior of the casing into a pressure chamber on the holder side and a back pressure chamber on an opposite side;
a filter comprising a filter part configured to filter fluid entering the pressure chamber and a holding part configured to secure the filtering part; and
an alignment structure positioned in the pressure chamber, wherein the alignment structure is configured to align the holding part at a predetermined position with respect to the casing, wherein the alignment structure comprises an abutment portion that contact the inner peripheral stopper portion formed at an upper area of the abutment portion, wherein the stopper portion contacts an upward surface of the inner peripheral wall.

9. The pressure regulating valve of claim 8, wherein the alignment structure extends radially from a surface of the holder.

10. The pressure regulating valve of claim 9, wherein the abutment portion contacts an upper portion of the holding part.

11. The pressure regulating valve of claim 8, wherein a width of a gap formed between the outer peripheral wall of the holder and an inner peripheral wall of the holding part is smaller than a width of the communication passage.

12. The pressure regulating valve of claim 8, wherein the alignment structure is positioned at least partially between the filter part and the holder.

13. The pressure regulating valve of claim 8, wherein the alignment structure comprises an alignment column extending upwards from an upper surface of the filter part and an alignment hole formed in a lower surface of the holder.

14. The pressure regulating valve of claim 13, wherein the alignment column has a height greater than a height of the holding part.

15. The pressure regulating valve of claim 8, wherein at least a portion of the holding part does not contact a lower portion of the holder.

16. The pressure regulating valve of claim 8, wherein a width of a gap formed between the outer peripheral wall of the holder and an inner peripheral wall of the holding part is equal to or greater than a width of the communication passage.

* * * * *